(12) United States Patent
Millington et al.

(10) Patent No.: US 11,788,450 B2
(45) Date of Patent: *Oct. 17, 2023

(54) TWC CATALYSTS FOR GASOLINE ENGINE EXHAUST GAS TREATMENTS

(71) Applicant: Johnson Matthey Public Limited Company, London (GB)

(72) Inventors: Paul Millington, Reading (GB); Maria C. Vlachou, Reading (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/451,352

(22) Filed: Oct. 19, 2021

(65) Prior Publication Data

US 2022/0136417 A1     May 5, 2022

Related U.S. Application Data

(60) Provisional application No. 63/107,479, filed on Oct. 30, 2020.

(51) Int. Cl.
*B01J 21/04*     (2006.01)
*B01J 21/06*     (2006.01)
(Continued)

(52) U.S. Cl.
CPC ............ *F01N 3/101* (2013.01); *B01J 23/002* (2013.01); *B01J 23/10* (2013.01); *B01J 23/42* (2013.01);
(Continued)

(58) Field of Classification Search
CPC . B01J 21/04; B01J 21/066; B01J 21/08; B01J 21/10; B01J 21/12; B01J 23/002;
(Continued)

(56) References Cited

U.S. PATENT DOCUMENTS 4,369,132 A * 1/1983 Kinoshita ................ B01J 23/63
                                                              502/333
4,675,308 A * 6/1987 Wan ......................... B01J 37/04
                                                              502/302

(Continued)

FOREIGN PATENT DOCUMENTS

WO     2009089151 A1     7/2009

OTHER PUBLICATIONS

Hu et al., "Performance and Structure of Pt—Rh Three-Way Catalysts: Mechanism for Pt/Rh Synergism", Journal of Catalysis, 174, 1998, 13-21.
(Continued)

*Primary Examiner* — Cam N. Nguyen
(74) *Attorney, Agent, or Firm* — Ni Yan

(57) ABSTRACT

A three-way catalyst article, and its use in an exhaust system for internal combustion engines, is disclosed. The catalyst article for treating exhaust gas comprising: a substrate comprising an inlet end and an outlet end with an axial length L; a first catalytic region comprising a first platinum group metal (PGM) component supported on a first PGM support material, wherein the first PGM component comprises rhodium (Rh) and platinum (Pt); and wherein Pt and Rh has a weight ratio of at least 1:10.

13 Claims, 3 Drawing Sheets

(51) Int. Cl.
  *B01J 21/08*   (2006.01)
  *B01J 21/10*   (2006.01)
  *B01J 21/12*   (2006.01)
  *B01J 23/00*   (2006.01)
  *B01J 23/10*   (2006.01)
  *B01J 23/42*   (2006.01)
  *B01J 23/44*   (2006.01)
  *B01J 23/46*   (2006.01)
  *B01J 23/63*   (2006.01)
  *B01J 35/00*   (2006.01)
  *B01J 35/04*   (2006.01)
  *B01D 53/94*   (2006.01)
  *F01N 3/10*   (2006.01)
  *F01N 3/28*   (2006.01)
  *B01J 37/03*   (2006.01)

(52) U.S. Cl.
  CPC ............ *B01J 23/44* (2013.01); *B01J 23/464* (2013.01); *B01J 37/038* (2013.01); *F01N 2570/10* (2013.01); *F01N 2570/12* (2013.01); *F01N 2570/14* (2013.01)

(58) Field of Classification Search
  CPC ... B01J 23/10; B01J 23/42; B01J 23/44; B01J 23/464; B01J 23/63; B01J 35/0006; B01J 35/004; B01J 35/04; B01D 53/945; B01D 53/9468; B01D 53/9472; B01N 3/101; B01N 3/2803
  USPC ........ 502/258–262, 302–304, 327, 332–334, 502/339, 349, 355, 415, 439, 527.12, 502/527.13, 529.13
  See application file for complete search history.

(56) References Cited

U.S. PATENT DOCUMENTS

| | | | | |
|---|---|---|---|---|
| 4,678,770 | A * | 7/1987 | Wan | B01D 53/945 502/302 |
| 4,904,633 | A * | 2/1990 | Ohata | B01J 23/63 502/328 |
| 4,963,521 | A * | 10/1990 | Engler | B01J 23/63 502/207 |
| 5,275,997 | A * | 1/1994 | Ganguli | B01J 23/464 502/332 |
| 5,286,699 | A * | 2/1994 | Ohata | B01J 23/63 502/527.19 |
| 5,376,610 | A * | 12/1994 | Takahata | F01N 3/222 502/65 |
| 6,596,243 | B1 * | 7/2003 | Fujii | F01N 3/2807 422/177 |
| 6,692,712 | B1 * | 2/2004 | Andersen | B01J 23/63 423/239.1 |
| 6,806,225 | B1 * | 10/2004 | Ikeda | B01D 53/945 502/328 |
| 7,276,212 | B2 * | 10/2007 | Hu | B01J 23/63 422/177 |
| 7,329,629 | B2 * | 2/2008 | Gandhi | B01J 23/58 502/340 |
| 7,341,975 | B2 * | 3/2008 | Iwakuni | C01G 25/006 502/333 |
| 7,608,561 | B2 * | 10/2009 | Miyoshi | B01J 23/63 502/332 |
| 7,737,077 | B2 * | 6/2010 | Kitamura | B01J 23/40 502/262 |
| 7,758,834 | B2 * | 7/2010 | Chen | F01N 13/0097 60/299 |
| 7,759,283 | B2 * | 7/2010 | Yamato | B01J 37/0248 502/262 |
| 7,795,172 | B2 * | 9/2010 | Foong | B01J 23/63 502/527.19 |
| 7,846,863 | B2 * | 12/2010 | Taki | B01D 53/945 502/303 |
| 7,846,865 | B2 * | 12/2010 | Yamato | B01J 37/0248 502/262 |
| 7,922,988 | B2 * | 4/2011 | Deeba | B01D 53/9472 422/177 |
| 7,998,896 | B2 * | 8/2011 | Kitamura | B01J 37/0244 502/355 |
| 8,007,750 | B2 * | 8/2011 | Chen | B01D 53/945 502/262 |
| 8,071,502 | B2 * | 12/2011 | Shimizu | B01J 35/0006 502/325 |
| 8,080,494 | B2 * | 12/2011 | Yasuda | F01N 3/2803 502/328 |
| 8,158,552 | B2 * | 4/2012 | Hori | B01D 53/945 423/213.5 |
| 8,168,560 | B2 * | 5/2012 | Taki | B01J 23/464 502/333 |
| 8,309,488 | B2 * | 11/2012 | Kitamura | B01J 23/63 502/355 |
| 8,496,899 | B2 * | 7/2013 | Imai | B01J 23/58 502/328 |
| 8,551,908 | B2 * | 10/2013 | Satou | B01J 37/0244 502/262 |
| 8,617,496 | B2 * | 12/2013 | Wei | B01J 35/04 502/514 |
| 8,679,411 | B2 * | 3/2014 | Akamine | B01J 37/0244 422/171 |
| 8,713,921 | B2 * | 5/2014 | Akamine | B01J 23/63 60/299 |
| 8,828,343 | B2 * | 9/2014 | Liu | B01J 35/0006 502/262 |
| 8,833,064 | B2 * | 9/2014 | Galligan | B01J 37/0244 502/262 |
| 8,927,454 | B2 * | 1/2015 | Itou | B01J 37/0244 502/262 |
| 8,975,204 | B2 * | 3/2015 | Hori | B01J 23/63 502/325 |
| 9,266,092 | B2 * | 2/2016 | Arnold | B01J 23/63 |
| 9,440,223 | B2 * | 9/2016 | Aoki | B01J 35/0006 |
| 9,517,462 | B2 * | 12/2016 | Roesch | B01J 23/63 |
| 9,550,176 | B2 * | 1/2017 | Sato | B01J 29/068 |
| 9,579,633 | B2 * | 2/2017 | Suzuki | B01D 53/9468 |
| 9,597,663 | B2 * | 3/2017 | Inoda | B01J 23/464 |
| 9,656,209 | B2 * | 5/2017 | Chang | B01J 37/0063 |
| 9,707,545 | B2 * | 7/2017 | Felix | B01J 23/8946 |
| 9,833,771 | B2 * | 12/2017 | Goto | B01J 35/0006 |
| 9,839,902 | B2 * | 12/2017 | Suzuki | B01J 37/0244 |
| 9,873,085 | B2 * | 1/2018 | Yoshida | B01J 23/63 |
| 9,937,487 | B2 * | 4/2018 | Miura | B01D 53/945 |
| 9,999,871 | B2 * | 6/2018 | Aoki | B01J 23/63 |
| 10,150,082 | B2 * | 12/2018 | Yoshikawa | B01J 37/08 |
| 10,183,253 | B2 * | 1/2019 | Onoe | B01J 35/0006 |
| 10,413,885 | B2 * | 9/2019 | Suzuki | B01J 35/04 |
| 10,556,223 | B2 * | 2/2020 | Suzuki | B01J 37/031 |
| 10,576,420 | B2 * | 3/2020 | Chinzei | C01F 17/224 |
| 10,603,655 | B2 * | 3/2020 | Chandler | B01D 53/9422 |
| 10,618,034 | B2 * | 4/2020 | Kasuya | F01N 3/2803 |
| 10,625,243 | B2 * | 4/2020 | Clowes | B01J 35/04 |
| 10,626,765 | B2 * | 4/2020 | Inoda | F01N 3/0222 |
| 10,634,030 | B2 * | 4/2020 | Li | B01J 37/088 |
| 10,695,752 | B2 * | 6/2020 | Misumi | B01J 35/0073 |
| 10,704,441 | B2 * | 7/2020 | Yamashita | B01J 27/232 |
| 10,753,248 | B2 * | 8/2020 | Hirota | B01J 35/0006 |
| 10,773,209 | B2 * | 9/2020 | Liu | B01J 37/0225 |
| 10,801,382 | B2 * | 10/2020 | Ochiai | F01N 3/035 |
| 10,850,269 | B2 * | 12/2020 | Tanaka | B01D 46/24492 |
| 10,875,010 | B2 * | 12/2020 | Nagaoka | F01N 3/101 |
| 10,987,658 | B2 * | 4/2021 | Camm | B01J 37/0215 |
| 11,110,435 | B2 * | 9/2021 | Onoe | B01J 35/0006 |
| 11,117,097 | B2 * | 9/2021 | Martin | B01J 35/04 |
| 11,118,156 | B2 * | 9/2021 | Belgrader | C12N 1/066 |
| 11,141,697 | B2 * | 10/2021 | Chen | B01J 23/002 |
| 11,161,098 | B2 * | 11/2021 | Nunan | B01J 37/0201 |
| 11,167,269 | B1 * | 11/2021 | Qi | F01N 13/0097 |
| 11,207,642 | B2 * | 12/2021 | Goodwin | B01D 53/945 |
| 11,446,637 | B2 * | 9/2022 | Yang | B01J 23/42 |

(56) References Cited

U.S. PATENT DOCUMENTS

| | | | |
|---|---|---|---|
| 2001/0046941 A1 | 11/2001 | Mussmann et al. | |
| 2008/0081761 A1* | 4/2008 | Suzuki | B01J 35/0006 |
| | | | 502/339 |
| 2009/0069174 A1* | 3/2009 | Morikawa | B01J 35/002 |
| | | | 502/328 |
| 2009/0175773 A1* | 7/2009 | Chen | B01J 20/3021 |
| | | | 422/177 |
| 2010/0158768 A1* | 6/2010 | Iwachido | B01J 23/63 |
| | | | 502/328 |
| 2014/0038812 A1* | 2/2014 | Hori | B01J 37/0244 |
| | | | 502/304 |
| 2015/0266014 A1* | 9/2015 | Xue | F01N 3/0842 |
| | | | 502/328 |
| 2016/0288100 A1* | 10/2016 | Goto | B01J 23/002 |
| 2017/0189892 A1* | 7/2017 | Yin | B01J 37/024 |
| 2017/0312691 A1* | 11/2017 | Sato | B01J 23/44 |
| 2018/0169624 A1* | 6/2018 | Chandler | B01J 23/002 |
| 2018/0311646 A1* | 11/2018 | Chandler | B01J 21/04 |
| 2019/0105636 A1* | 4/2019 | Wang | F01N 3/20 |
| 2019/0111389 A1* | 4/2019 | Camm | B01J 23/63 |
| 2019/0126248 A1* | 5/2019 | Chinzei | B01J 23/58 |
| 2019/0240643 A1* | 8/2019 | Karpov | B01J 37/0211 |
| 2020/0102868 A1* | 4/2020 | Fujimori | B01J 23/42 |
| 2020/0276563 A1* | 9/2020 | Cheng | B01J 37/0244 |
| 2020/0347763 A1* | 11/2020 | Liu | B01J 23/464 |
| 2021/0213425 A1* | 7/2021 | Nakashima | B01J 37/0207 |
| 2021/0262371 A1* | 8/2021 | Chen | B01J 23/63 |
| 2021/0283580 A1* | 9/2021 | Zheng | B01J 35/1019 |
| 2021/0299637 A1* | 9/2021 | Kobayashi | B01D 53/945 |
| 2021/0394159 A1* | 12/2021 | Yang | B01J 23/464 |
| 2022/0055021 A1* | 2/2022 | Liu | B01D 53/9472 |
| 2022/0072514 A1* | 3/2022 | Chandler | F01N 3/0842 |
| 2022/0072515 A1* | 3/2022 | Jing | F01N 3/101 |
| 2022/0161236 A1* | 5/2022 | Vjunov | B01J 23/40 |
| 2022/0193639 A1* | 6/2022 | Vjunov | F01N 3/101 |
| 2022/0203339 A1* | 6/2022 | Zheng | B01D 53/9477 |
| 2022/0212170 A1* | 7/2022 | Sung | B01J 35/0006 |

OTHER PUBLICATIONS

Oh et al., "Platinum-rhodium synergism in three way automotive catalysts"—Journal of Catalysis, 98, 1986, 178-190.

* cited by examiner

TWC CATALYSTS FOR GASOLINE ENGINE EXHAUST GAS TREATMENTS

FIELD OF THE INVENTION

The present invention relates to a catalyzed article useful in treating exhaust gas emissions from gasoline engines.

BACKGROUND OF THE INVENTION

Internal combustion engines produce exhaust gases containing a variety of pollutants, including hydrocarbons (HCs), carbon monoxide (CO), and nitrogen oxides ("$NO_N$"). Emission control systems, including exhaust gas catalytic conversion catalysts, are widely utilized to reduce the amount of these pollutants emitted to atmosphere. A commonly used catalyst for gasoline engine exhaust treatments is the TWC (three way catalyst). TWCs perform three main functions: (1) oxidation of CO; (2) oxidation of unburnt HCs; and (3) reduction of $NO_N$.

Palladium (Pd) and rhodium (Rh) have been widely used in TWC formulations to reduce harmful emissions in gasoline vehicles. Rh is most active for TWC reactions when in a metallic state and limiting Rh deactivation during catalyst operation is essential in maintaining good activity. Rh is particularly susceptible to (mostly reversible) deactivation during lean conditions of the gasoline engine, during fuel cut events and when the engine is switched off (and the catalyst cools in air). During the catalyst's recovery from these events, significant reactant slip can occur.

In addition, recently, precious metal prices (e.g., Pd and Rh) have climbed up to be even more precious, due to rising demand in the market. A reduction of Rh loading and an improvement in Rh performance is required to ensure TWCs are affordable whilst equipped to meet future emissions regulations. On the other hand, tighter and tighter environmental regulations worldwide have forced automobile industries to put even more precious metals into their catalytic converters.

In the meantime, platinum (Pt) has become a more attractive candidate for gasoline applications due to its relatively cheaper price. In the last 12 months (from September 2020, according to http://www.platinum.matthey.com), the average prices of Pt and Rh were about $888 and $8468 dollars/Oz respectively. Thus, there are huge financial incentives on how to introduce Pt into catalyst formulations, to at least partially replace Rh while hoping to maintain comparable catalyst performances.

In this invention, through intensive research, inventors have not only successfully developed and tested cost-effective novel catalyst designs but also, surprisingly, demonstrated that a beneficial Rh—Pt interaction limits the deactivation of Rh during lean events and improves light off and transient performances.

SUMMARY OF THE INVENTION

One aspect of the present disclosure is directed to a catalyst composition comprising a platinum group metal (PGM) component supported on a PGM support material, wherein the PGM component comprises rhodium (Rh) and platinum (Pt); and wherein Pt and Rh has a weight ratio of at least 1:10.

Another aspect of the present disclosure is directed to a catalytic article for treating exhaust gas comprising: a substrate comprising an inlet end and an outlet end with an axial length L; a first catalytic region comprising a first platinum group metal (PGM) component supported on a first PGM support material, wherein the first PGM component comprises rhodium (Rh) and platinum (Pt); and wherein Pt and Rh has a weight ratio of at least 1:10.

The invention also encompasses an exhaust system for internal combustion engines that comprises the three-way catalyst component of the invention.

The invention also encompasses treating an exhaust gas from an internal combustion engine, in particular for treating exhaust gas from a gasoline engine. The method comprises contacting the exhaust gas with the three-way catalyst component of the invention.

BRIEF DESCRIPTION OF THE DRAWINGS

FIG. 2b depicts a variation of FIG. 2a.

FIG. 3b depicts a variation of FIG. 3a.

DETAILED DESCRIPTION OF THE INVENTION

Figure 1:
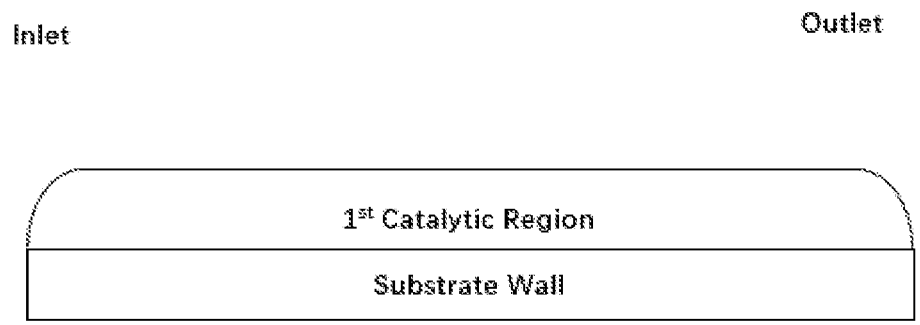
FIG. 1 shows one embodiment according to the present invention, which contains first catalytic region with a length of 100% to the axial length L of the substrate (single layer).

The present invention is directed to the catalytic treatment of combustion exhaust gas, such as that produced by gasoline and other engines, and to related catalysts compositions, catalytic articles, and systems. More specifically, the invention relates the simultaneous treatment of $NO_N$, CO, and HC in a vehicular exhaust system. More specifically, this invention relates to cost effective approaches in novel TWC designs through optimized Pt and Rh ratio, range, and location control compared with traditional Pd/Rh TWC catalyst and simultaneous treatment of $NO_N$, CO, and HC in a vehicular exhaust system.

One aspect of the present disclosure is directed to a catalyst composition comprising a platinum group metal (PGM) component supported on a PGM support material, wherein the PGM component comprises rhodium (Rh) and platinum (Pt); and wherein Pt and Rh has a weight ratio of at least 1:10.

Through intensive research, the inventors have found that by incorporating both Rh and Pt into the PGM support material, these novel compositions have demonstrated excellent catalytic properties.

In some embodiments, Pt and Rh can have a weight ratio of at least 1:8, 1:6 or 1:5. Alternatively, in other embodiments, Pt and Rh can have a weight ratio of 10:1 to 1:10, 8:1 to 1:8, 6:1 to 1:6, or 5:1 to 1:5. In certain embodiments, Pt and Rh can have a weight ratio of 8:1 to 1:10, 6:1 to 1:10, 5:1 to 1:10, or 1:1 to 1:10.

The PGM support material can be an oxygen storage capacity (OSC) material, $ZrO_2$, or rare earth metal doped $ZrO_2$.

Suitable rare earth metal for the doped $ZrO_2$ can be La, Pr, Nd, Y, Ce or a combination thereof. When doped with rare earth metal, the rare earth metal content can be no more than 20% by weight, based on rare earth metal oxide. In certain embodiments, the rare earth metal content can be no more than 15% or no more than 10% by weight, based on rare earth metal oxide.

The OSC material can be cerium oxide, a ceria-zirconia mixed oxide, an alumina-ceria-zirconia mixed oxide, or a combination thereof. More preferably, the OSC material comprises the ceria-zirconia mixed oxide, the alumina-ceria-zirconia mixed oxide or a combination thereof. The ceria-zirconia mixed oxide can further comprise dopants, such as lanthanum, neodymium, praseodymium, yttrium oxides, etc. In addition, the OSC material may function as a support material for the PGM component. In some embodiments, the OSC material comprises the ceria-zirconia mixed oxide and the alumina-ceria-zirconia mixed oxide.

In some embodiments, the ceria-zirconia mixed oxide can comprise at least 35 wt % $CeO_2$; preferably, at least 40 wt % $CeO_2$; more preferably, at least 45 wt % $CeO_2$. Alternatively, in certain embodiments, the ceria-zirconia mixed oxide can comprise 35 wt %-75 wt % $CeO_2$; preferably, 40 wt %-60 wt % $CeO_2$; more preferably, 45 wt %-55 wt % $CeO_2$.

In some embodiments, the catalyst composition can further comprise an inorganic oxide. The inorganic oxide is preferably an oxide of Groups 2, 3, 4, 5, 13 and 14 elements. The inorganic oxide is preferably selected from the group consisting of alumina, magnesia, silica, barium oxides, and mixed oxides or composite oxides thereof. Particularly preferably, the inorganic oxide is alumina, lanthanum-alumina, or a magnesia/alumina composite oxide. One especially preferred inorganic oxide is alumina or lanthanum-alumina.

The OSC material and the inorganic oxide can have a weight ratio of no greater than 10:1; preferably, no greater than 8:1 or 5:1; more preferably, no greater than 4:1 or 3:1; most preferably, no greater than 2:1.

Alternatively, the OSC material and the inorganic oxide can have a weight ratio of 10:1 to 1:10; preferably, 8:1 to 1:8 or 5:1 to 1:5; more preferably, 4:1 to 1:4 or 3:1 to 1:3; and most preferably, 2:1 to 1:2.

In some embodiments, the OSC material and the inorganic oxide can have a weight ratio of no less than 2:1. In further embodiments, the OSC material and the inorganic oxide can have a weight ratio of no less than 10:1. In another further embodiments, the OSC material and the inorganic oxide can have a weight ratio of no less than 20:1 or no less than 30:1. In yet another further embodiments, the OSC material and the inorganic oxide can have a weight ratio of no less than 40:1 or no less than 50:1.

The catalyst composition may further comprise an alkali or alkaline earth metal.

The alkali or alkaline earth metal is preferably barium, or strontium, and mixed oxides or composite oxides thereof. Preferably the barium or strontium, where present, is loaded in an amount of 0.1 to 15 wt. %, and more preferably 3 to 10 wt. % of barium or strontium, based on the total weight of the catalyst composition.

Preferably the barium or the strontium is present as $BaCO_3$ or $SrCO_3$. Such a material can be performed by any method known in the art, for example incipient wetness impregnation or spray-drying.

In some embodiments, Rh and Pt are not supported on the inorganic oxide.

In certain embodiments, the catalyst composition can further comprise palladium (Pd). In further embodiments, Pd can be supported on the inorganic oxide. In yet other embodiments, Pd is not supported on the PGM support material.

As demonstrated in the Examples below, the catalyst compositions in this aspect can be applied as a TWC catalyst for treating exhaust gas produced by gasoline engines.

Another aspect of the present disclosure is directed to a catalytic article for treating exhaust gas comprising: a substrate comprising an inlet end and an outlet end with an axial length L; a first catalytic region comprising a first platinum group metal (PGM) component supported on a first PGM support material, wherein the first PGM component comprises rhodium (Rh) and platinum (Pt); and wherein Pt and Rh has a weight ratio of at least 1:10.

First Catalytic Region

In some embodiments, Pt and Rh can have a weight ratio of at least 1:8, 1:6 or 1:5. Alternatively, in other embodiments, Pt and Rh can have a weight ratio of 10:1 to 1:10, 8:1 to 1:8, 6:1 to 1:6, or 5:1 to 1:5. In certain embodiments, Pt and Rh can have a weight ratio of 8:1 to 1:10, 6:1 to 1:10, 5:1 to 1:10, or 1:1 to 1:10.

The first PGM support material can be a first oxygen storage capacity (OSC) material, $ZrO_2$, or rare earth metal doped $ZrO_2$.

Suitable rare earth metal for the doped $ZrO_2$ can be La, Pr, Nd, Y, Ce or a combination thereof. When doped with rare earth metal, the rare earth metal content can be no more than 20% by weight, based on rare earth metal oxide. In certain embodiments, the rare earth metal content can be no more than 15% or no more than 10% by weight, based on rare earth metal oxide.

The first OSC material can be cerium oxide, a ceria-zirconia mixed oxide, an alumina-ceria-zirconia mixed oxide, or a combination thereof. More preferably, the first OSC material comprises the ceria-zirconia mixed oxide, the alumina-ceria-zirconia mixed oxide or a combination thereof. The ceria-zirconia mixed oxide can further comprise dopants, such as lanthanum, neodymium, praseodymium, yttrium oxides, etc. In addition, the first OSC material may function as a support material for the first PGM component. In some embodiments, the first OSC material comprises the ceria-zirconia mixed oxide and the alumina-ceria-zirconia mixed oxide.

In some embodiments, the ceria-zirconia mixed oxide can comprise at least 35 wt % $CeO_2$; preferably, at least 40 wt % $CeO_2$; more preferably, at least 45 wt % $CeO_2$. Alternatively, in certain embodiments, the ceria-zirconia mixed oxide can comprise 35 wt %-75 wt % $CeO_2$; preferably, 40 wt %-60 wt % $CeO_2$; more preferably, 45 wt %-55 wt % $CeO_2$.

In some embodiments, the first catalytic region can further comprise a first inorganic oxide. The first inorganic oxide is preferably an oxide of Groups 2, 3, 4, 5, 13 and 14 elements. The first inorganic oxide is preferably selected from the group consisting of alumina, magnesia, silica, barium oxides, and mixed oxides or composite oxides thereof. Particularly preferably, the first inorganic oxide is alumina, lanthanum-alumina, or a magnesia/alumina composite oxide. One especially preferred first inorganic oxide is alumina or lanthanum-alumina.

The first OSC material and the first inorganic oxide can have a weight ratio of no greater than 10:1; preferably, no greater than 8:1 or 5:1; more preferably, no greater than 4:1 or 3:1; most preferably, no greater than 2:1.

Alternatively, the first OSC material and the first inorganic oxide can have a weight ratio of 10:1 to 1:10; preferably, 8:1 to 1:8 or 5:1 to 1:5; more preferably, 4:1 to 1:4 or 3:1 to 1:3; and most preferably, 2:1 to 1:2.

In some embodiments, the first OSC material and the first inorganic oxide can have a weight ratio of no less than 2:1. In further embodiments, the first OSC material and the first inorganic oxide can have a weight ratio of no less than 10:1. In another further embodiments, the first OSC material and the first inorganic oxide can have a weight ratio of no less than 20:1 or no less than 30:1. In yet another further embodiments, the first OSC material and the first inorganic oxide can have a weight ratio of no less than 40:1 or no less than 50:1.

The first catalytic region may further comprise a first alkali or alkaline earth metal.

The first alkali or alkaline earth metal is preferably barium, or strontium, and mixed oxides or composite oxides thereof. Preferably the barium or strontium, where present, is loaded in an amount of 0.1 to 15 wt. %, and more preferably 3 to 10 wt. % of barium or strontium, based on the total weight of the first catalytic region.

Preferably the barium or the strontium is present as $BaCO_3$ or $SrCO_3$. Such a material can be performed by any method known in the art, for example incipient wetness impregnation or spray-drying.

In some embodiments, Rh and Pt are not supported on the first inorganic oxide.

In certain embodiments, the first catalytic region can further comprise palladium (Pd). In further embodiments, Pd can be supported on the first inorganic oxide. In yet other embodiments, Pd is not supported on the first PGM support material.

As demonstrated in the Examples below, the catalyst article in this aspect can be applied as a TWC catalyst for treating exhaust gas produced by gasoline engines.

Figure 2A:
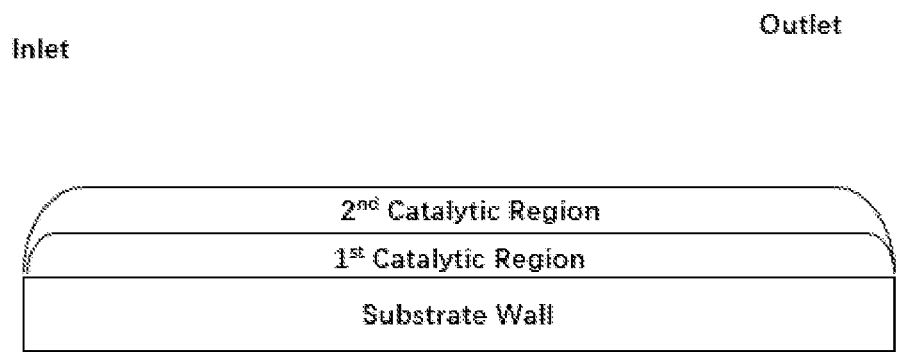
FIG. 2a shows one embodiment according to the present invention, the first catalytic region extends 100% of the axial length L, as bottom layer; the second catalytic region extends 100% of the axial length L, as top layer.
Figure 2B:
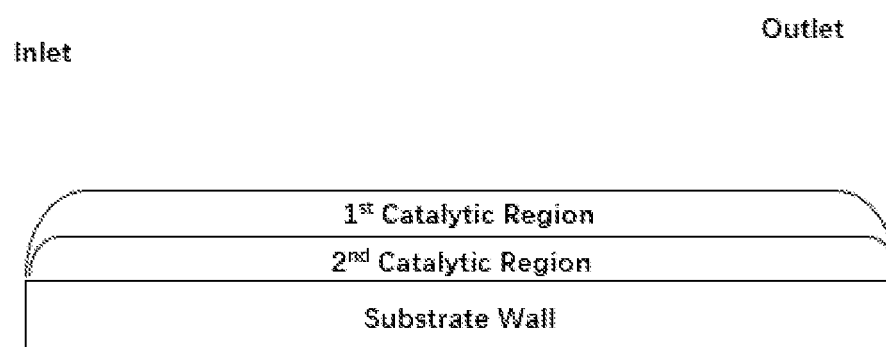

The first catalytic region can extend for 100 percent of the axial length L. (E.g., see FIGS. 1, 2a, and 2b). In some embodiments, the first catalytic region can extend for 20 to 99%, 30 to 90%, or 40-80% of the axial length L. Alternatively, the first catalytic region can extend for 30 to 70 percent of the axial length L. Preferably, for 40 to 60 percent, more preferably, 45 to 55 percent of the axial length L, (E.g., see FIGS. 3a-3d).

The total washcoat loading of the first catalytic region can be less than 3.5 $g/in^3$; preferably, less than 3.0 $g/in^3$ or 2.5 $g/in^3$. Alternatively, the total washcoat loading of the first catalytic region can be from 0.5 to 3.5 $g/in^3$; preferably, can be from 0.6 to 3 $g/in^3$ or 0.7 to 2.5 $g/in^3$.

Second Catalytic Region

The catalytic article may further comprise a second catalytic region.

The second catalytic region can further comprise a second PGM component, a second oxygen storage capacity (OSC) material, a second alkali or alkaline earth metal component, and/or a second inorganic oxide.

The second PGM component can be selected from the group consisting of platinum, palladium, rhodium, and a mixture thereof. In some embodiments, the second PGM component can be Pd, Rh or a mixture thereof. In other embodiments, the second PGM component can be Pd, Pt or a mixture thereof. In further embodiments, the second PGM component can be Pd. In certain embodiments, the first catalyst region can be substantially free of Pd. In further embodiments, the first catalyst region can be essentially free of Pd or does not comprise Pd. The expression "substantially free of" as used herein with reference to PGM (e.g., Pd) means that PGM (e.g., Pd) in a minor amount, such as ≤5% by weight, preferably ≤2% by weight, more preferably ≤1% by weight of the total PGM amount in the first catalytic region. The expression "essentially free of" as used herein with reference to PGM (e.g., Pd) means that PGM (e.g., Pd) in a trace amount, such as ≤1% by weight, preferably ≤0.5% by weight, more preferably ≤0.1% by weight the total PGM amount in the first catalytic region. The expression "essentially free of" embraces the expression "does not comprise."

The second OSC material can be cerium oxide, a ceria-zirconia mixed oxide, an alumina-ceria-zirconia mixed oxide, or a combination thereof. More preferably, the second OSC material comprises the ceria-zirconia mixed oxide, the alumina-ceria-zirconia mixed oxide, or a combination thereof. In addition, the second OSC material may further comprise one or more of dopants like lanthanum, neodymium, praseodymium, yttrium etc. Moreover, the second OSC material may have the function as a support material for the second PGM component. In some embodiments, the second OSC material comprises the ceria-zirconia mixed oxide and the alumina-ceria-zirconia mixed oxide.

The ceria-zirconia mixed oxide can have a weight ratio of zirconia to ceria at least 50:50; preferably, higher than 60:40; more preferably, higher than 70:30. Alternatively, the ceria-zirconia mixed oxide also can have a weight ratio of ceria to zirconia less than 50:50, preferably, less than 40:60, more preferably, less than 30:70.

The second OSC material (e.g., ceria-zirconia mixed oxide) can be from 10 to 90 wt. %; preferably, 25-75 wt. %; more preferably, 30-60 wt. %, based on the total washcoat loading of the second catalytic region.

The second OSC material loading in the second catalytic region can be less than 2 $g/in^3$. In some embodiments, the second OSC material loading in the second catalytic region is no greater than 1.5 $g/in^3$, 1.2 $g/in^3$, 1 $g/in^3$, 0.8 $g/in^3$, or 0.7 $g/in^3$.

The second alkali or alkaline earth metal is preferably barium, strontium, mixed oxides or composite oxides thereof. Preferably the barium or strontium, where present, is in an amount of 0.1 to 15 wt. %, and more preferably 3 to 10 wt. % of barium or strontium, based on the total weight of the second catalytic region.

It is even more preferable that the second alkali or alkaline earth metal is strontium. The strontium, where present, is preferably present in an amount of 0.1 to 15 wt. %, and more preferably 3 to 10 wt. %, based on the total weight of the second catalytic region.

It is also preferable that the second alkali or alkaline earth metal is mixed oxides or composite oxide of barium and strontium. Preferably, the mixed oxides or composite oxide of barium and strontium is present in an amount of 0.1 to 15 wt. %, and more preferably 3 to 10 wt. %, based on the total weight of the second catalytic region. It is more preferable that the second alkali or alkaline earth metal is composite oxide of barium and strontium.

Preferably the barium or strontium is present as $BaCO_3$ or $SrCO_3$. Such a material can be performed by any method known in the art, for example incipient wetness impregnation or spray-drying.

The second inorganic oxide is preferably an oxide of Groups 2, 3, 4, 5, 13 and 14 elements. The second inorganic oxide is preferably selected from the group consisting of alumina, magnesia, silica, zirconia, barium oxides, and mixed oxides or composite oxides thereof. Particularly preferably, the second inorganic oxide is alumina, lanthanum-alumina, zirconia, or a magnesia/alumina composite oxide. One especially preferred second inorganic oxide is alumina or lanthanum-alumina.

The second OSC material and the second inorganic oxide can have a weight ratio of no greater than 10:1; preferably, no greater than 8:1 or 5:1; more preferably, no greater than 4:1 or 3:1; most preferably, no greater than 2:1.

Alternatively, the second OSC material and the second inorganic oxide can have a weight ratio of 10:1 to 1:10; preferably, 8:1 to 1:8 or 5:1 to 1:5; more preferably, 4:1 to 1:4 or 3:1 to 1:3; and most preferably, 2:1 to 1:2.

In some embodiments, the second OSC material and the second inorganic oxide can have a weight ratio of no less than 2:1. In further embodiments, the second OSC material and the second inorganic oxide can have a weight ratio of no less than 10:1. In another further embodiments, the second OSC material and the second inorganic oxide can have a weight ratio of no less than 20:1 or no less than 30:1. In yet another further embodiments, the second OSC material and the second inorganic oxide can have a weight ratio of no less than 40:1 or no less than 50:1.

The total washcoat loading of the second catalytic region can be less than 3.5 $g/in^3$; preferably, less than 3.0 $g/in^3$ or 2.5 $g/in^3$. Alternatively, the total washcoat loading of the first catalytic region can be from 0.5 to 3.5 $g/in^3$; preferably, can be from 0.6 to 3 $g/in^3$ or 0.7 to 2.5 $g/in^3$.

The second catalytic region can extend for 100 percent of the axial length L. (E.g., see FIGS. 2a and 2b)

The second catalytic region can extend for 30 to 70 percent of the axial length L. Preferably, for 40 to 60 percent, more preferably, 45 to 55 percent of the axial length L. and most preferably, the total length of the second region and the first region is equal or greater than the axial length L (E.g., see FIGS. 3a-3d).

Figure 3A:
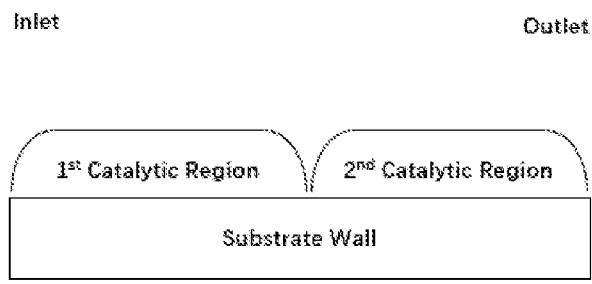
FIG. 3a shows one embodiment according to the present invention, the first catalytic region extends less than 100% of the axial length L, from the inlet end; the second catalytic region extends less than 100% of the axial length L, from the outlet end. The total length of the second and the first catalytic region is equal or less than the axial length L.
Figure 3B:
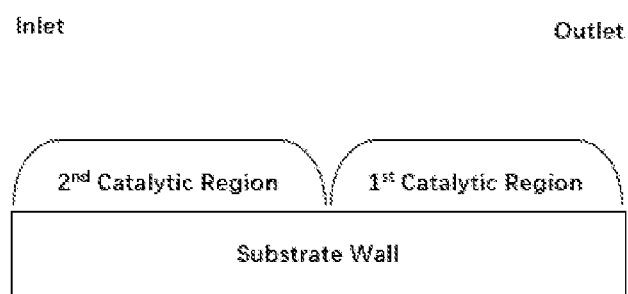
Figure 3C:
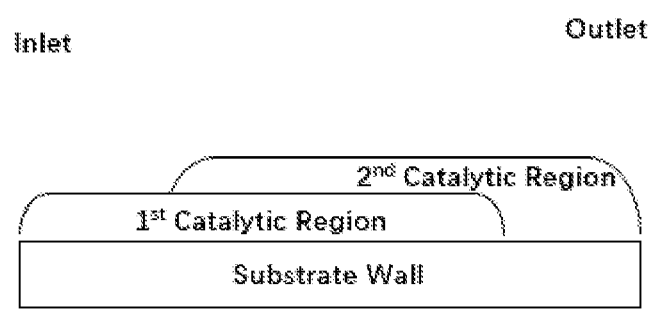
FIG. 3c shows one embodiment according to the present invention, the first catalytic region extends less than 100% of the axial length L, from the inlet end; the second catalytic region extends less than 100% of the axial length L, from the outlet end. The total length of the second and the first catalytic region is greater than the axial length L.
Figure 3D:
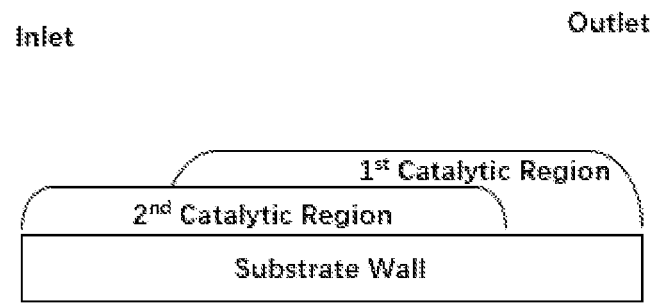
FIG. 3d depicts a variation of FIG. 3c.

The second catalytic region can overlap with the first catalytic region for 0.1 to 99 percent of the axial length L (e.g., see FIGS. 3c and 3d, the first catalytic region can overlie the second catalytic region or the second catalytic region can overlie the first catalytic region). Alternatively, the total length of the second catalytic region and the first catalytic region can equal to the axial length L (e.g., see FIGS. 3a and 3b). In yet another alternative, total the length of the second catalytic region and the first catalytic region can be less than the axial length L, for example, no greater than 95%, 90%, 80%, or 70% of the axial length L.

In some embodiments, the first catalytic region can be supported/deposited directly on the substrate. In certain embodiments, the second catalytic region can be supported/deposited directly on the substrate.

Third Catalytic Region

The catalytic article may further comprise a third catalytic region.

The third catalytic region can further comprise a third PGM component, a third oxygen storage capacity (OSC) material, a third alkali or alkaline earth metal component, and/or a third inorganic oxide.

The third catalytic region may have the same or similar composition as the second catalytic region.

The third catalytic region can be less than the axial length L, for example, no greater than 95%, 90%, 80%, 70%, 60% or 50% of the axial length L.

Substrate

Preferably the substrate is a flow-through monolith. Alternatively, the substrate can be a wall-flow filter.

The flow-through monolith substrate has a first face and a second face defining a longitudinal direction there between. The flow-through monolith substrate has a plurality of channels extending between the first face and the second face. The plurality of channels extends in the longitudinal direction and provide a plurality of inner surfaces (e.g. the surfaces of the walls defining each channel). Each of the plurality of channels has an opening at the first face and an opening at the second face. For the avoidance of doubt, the flow-through monolith substrate is not a wall flow filter.

The first face is typically at an inlet end of the substrate and the second face is at an outlet end of the substrate.

The channels may be of a constant width and each plurality of channels may have a uniform channel width.

Preferably within a plane orthogonal to the longitudinal direction, the monolith substrate has from 300 to 900 channels per square inch, preferably from 400 to 800. For example, on the first face, the density of open first channels and closed second channels is from 600 to 700 channels per square inch. The channels can have cross sections that are rectangular, square, circular, oval, triangular, hexagonal, or other polygonal shapes.

The monolith substrate acts as a support for holding catalytic material. Suitable materials for forming the monolith substrate include ceramic-like materials such as cordierite, silicon carbide, silicon nitride, zirconia, mullite, spodumene, alumina-silica magnesia or zirconium silicate, or of porous, refractory metal. Such materials and their use in the manufacture of porous monolith substrates are well known in the art.

It should be noted that the flow-through monolith substrate described herein is a single component (i.e. a single brick). Nonetheless, when forming an emission treatment system, the substrate used may be formed by adhering together a plurality of channels or by adhering together a plurality of smaller substrates as described herein. Such techniques are well known in the art, as well as suitable casings and configurations of the emission treatment system.

In embodiments wherein the catalyst article of the present comprises a ceramic substrate, the ceramic substrate may be made of any suitable refractory material, e.g., alumina, silica, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

In embodiments wherein the catalyst article of the present invention comprises a metallic substrate, the metallic substrate may be made of any suitable metal, and in particular heat-resistant metals and metal alloys such as titanium and stainless steel as well as ferritic alloys containing iron, nickel, chromium, and/or aluminium in addition to other trace metals.

Another aspect of the present disclosure is directed to a method for treating a vehicular exhaust gas containing $NO_x$, CO, and HC using the catalyst article described herein. Catalytic converters equipped with the TWC made according to this method show improved catalytic properties compared to conventional TWC (with the same PGM loading), also show especially improved performance in cold start stage and better THC light off performance (e.g., see Examples 2-4 and 6-7; and Tables 3-5 and 7-9).

Another aspect of the present disclosure is directed to a system for treating vehicular exhaust gas comprising the catalyst article described herein in conjunction with a conduit for transferring the exhaust gas through the system.

Definitions

The term "region" as used herein refers to an area on a substrate, typically obtained by drying and/or calcining a washcoat. A "region" can, for example, be disposed or supported on a substrate as a "layer" or a "zone". The area or arrangement on a substrate is generally controlled during the process of applying the washcoat to the substrate. The "region" typically has distinct boundaries or edges (i.e. it is possible to distinguish one region from another region using conventional analytical techniques).

Typically, the "region" has a substantially uniform length. The reference to a "substantially uniform length" in this context refers to a length that does not deviate (e.g. the difference between the maximum and minimum length) by more than 10%, preferably does not deviate by more than 5%, more preferably does not deviate by more than 1%, from its mean value.

It is preferable that each "region" has a substantially uniform composition (i.e. there is no substantial difference in the composition of the washcoat when comparing one part of the region with another part of that region). Substantially uniform composition in this context refers to a material (e.g., region) where the difference in composition when comparing one part of the region with another part of the region is 5% or less, usually 2.5% or less, and most commonly 1% or less.

The term "zone" as used herein refers to a region having a length that is less than the total length of the substrate, such as ≤75% of the total length of the substrate. A "zone" typically has a length (i.e. a substantially uniform length) of at least 5% (e.g. ≥5%) of the total length of the substrate.

The total length of a substrate is the distance between its inlet end and its outlet end (e.g. the opposing ends of the substrate).

Any reference to a "zone disposed at an inlet end of the substrate" used herein refers to a zone disposed or supported on a substrate where the zone is nearer to an inlet end of the substrate than the zone is to an outlet end of the substrate. Thus, the midpoint of the zone (i.e. at half its length) is nearer to the inlet end of the substrate than the midpoint is to the outlet end of the substrate. Similarly, any reference to a "zone disposed at an outlet end of the substrate" used herein refers to a zone disposed or supported on a substrate where the zone is nearer to an outlet end of the substrate than the zone is to an inlet end of the substrate. Thus, the midpoint of the zone (i.e. at half its length) is nearer to the outlet end of the substrate than the midpoint is to the inlet end of the substrate.

When the substrate is a wall-flow filter, then generally any reference to a "zone disposed at an inlet end of the substrate" refers to a zone disposed or supported on the substrate that is:

(a) nearer to an inlet end (e.g. open end) of an inlet channel of the substrate than the zone is to a closed end (e.g. blocked or plugged end) of the inlet channel, and/or (b) nearer to a closed end (e.g. blocked or plugged end) of an outlet channel of the substrate than the zone is to an outlet end (e.g. open end) of the outlet channel.

Thus, the midpoint of the zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel.

Similarly, any reference to a "zone disposed at an outlet end of the substrate" when the substrate is a wall-flow filter refers to a zone disposed or supported on the substrate that is:

(a) nearer to an outlet end (e.g. an open end) of an outlet channel of the substrate than the zone is to a closed end (e.g. blocked or plugged) of the outlet channel, and/or (b) nearer to a closed end (e.g. blocked or plugged end) of an inlet channel of the substrate than it is to an inlet end (e.g. an open end) of the inlet channel.

Thus, the midpoint of the zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

A zone may satisfy both (a) and (b) when the washcoat is present in the wall of the wall-flow filter (i.e. the zone is in-wall).

The term "washcoat" is well known in the art and refers to an adherent coating that is applied to a substrate usually during production of a catalyst.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "consist essentially" as used herein limits the scope of a feature to include the specified materials or steps, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a region, a layer or a zone, means that the material in a minor amount, such as ≤5% by weight, preferably ≤2% by weight, more preferably ≤1% by weight. The expression "substantially free of" embraces the expression "does not comprise."

The expression "essentially free of" as used herein with reference to a material, typically in the context of the content of a region, a layer or a zone, means that the material in a trace amount, such as ≤1% by weight, preferably ≤0.5% by weight, more preferably ≤0.1% by weight. The expression "essentially free of" embraces the expression "does not comprise."

Any reference to an amount of dopant, particularly a total amount, expressed as a % by weight as used herein refers to the weight of the support material or the refractory metal oxide thereof.

The term "loading" as used herein refers to a measurement in units of $g/ft^3$ on a metal weight basis.

The following examples merely illustrate the invention. Those skilled in the art will recognize many variations that are within the spirit of the invention and scope of the claims.

EXAMPLES

Catalysts 1-8

Catalysts 1-8 (Table 1) were prepared by the incipient wetness impregnation method. An OSC material (44.9% ceria, 48.3% zirconia, 1.5% $La_2O_3$, 5.3% $Nd_2O_3$) in powder form was impregnated with Rh nitrate solution, Pt nitrate solution, or a combination of the two, then dried at 100° C. and calcined at 650° C. for 2 hours. All catalysts were then hydrothermally aged for 16 hours in a 120 $Lh^{-1}$ flow in a perturbed gas mix with gas concentrations given in Table 2 at 950° C. Catalysts 1-8 were shutdown under lean conditions from 950° C. prior to light-off testing.

TABLE 1

Compositions of Catalysts 1-8

| Composition | PGM loading | Pt to Rh ratio by wt. |
|---|---|---|
| Comparative Catalyst 1 | 0.2 wt % Rh | 0 |
| Comparative Catalyst 2 | 0.17 wt % Rh | 0 |
| Comparative Catalyst 3 | 0.13 wt % Rh | 0 |
| Comparative Catalyst 4 | 0.1 wt % Rh | 0 |
| Comparative Catalyst 5 | 0.2 wt % Pt | ∞ |
| Catalyst 6 | 0.03 wt % Pt + 0.17 wt % Rh | 1:5 |
| Catalyst 7 | 0.07 wt % Pt + 0.13 wt % Rh | 1:2 |
| Catalyst 8 | 0.1 wt % Pt + 0.1 wt % Rh | 1:1 |

TABLE 2

Ageing conditions for Catalysts 1-8

| | Perturbed SCAT Ageing | |
|---|---|---|
| | Base mix | +pert. line |
| Lambda | 0.92 | 1.06 |
| Time | 300 sec | 300 sec |
| NO | 1000 ppm | |
| $H_2O$ | 10% | |
| CO | 0.52% | 0.52% |
| $C_3H_8$ | 1000 ppm | |
| $O_2$ | 0.27% | 1.06% |
| $N_2$ | 90% | 88% |
| Ramp rate | 5° C./min | |
| Temp/time | 950° C./16 hours | |
| Flow | 120 L/hour | |

Example 1: Light Off Performances in Synthetic Catalyst Activity Testing

Catalysts 1-8 were tested separately over a Synthetic Catalyst Activity Test (SCAT) device. The light off performance was tested in a perturbed gas flow with gas concentrations listed in Table 3, from 110° C. to 500° C. at a rate of 10° C./min and a space velocity of 1500 $Lg^{-1}h^{-1}$.

TABLE 3

Gas mix composition for the SCAT light-off experiments

| | Perturbed SCAT test | |
|---|---|---|
| | Base mix | +pert. line |
| Lambda | 0.99 | 0.05 |
| Time | 3 sec | 3 sec |
| NO | 2200 ppm | |
| $CO_2$ | 14% | |
| $H_2O$ | 4% | |

TABLE 3-continued

Gas mix composition for the SCAT light-off experiments

| | Perturbed SCAT test | |
|---|---|---|
| | Base mix | +pert. line |
| CO | 0.73% | 1.47% |
| $C_3H_6$ | 660 ppm | |
| $C_2H_6$ | 330 ppm | |
| $H_2$ | 0.23% | 0.46 |
| $O_2$ | Dependable on λ | 1% |

Figure 4:
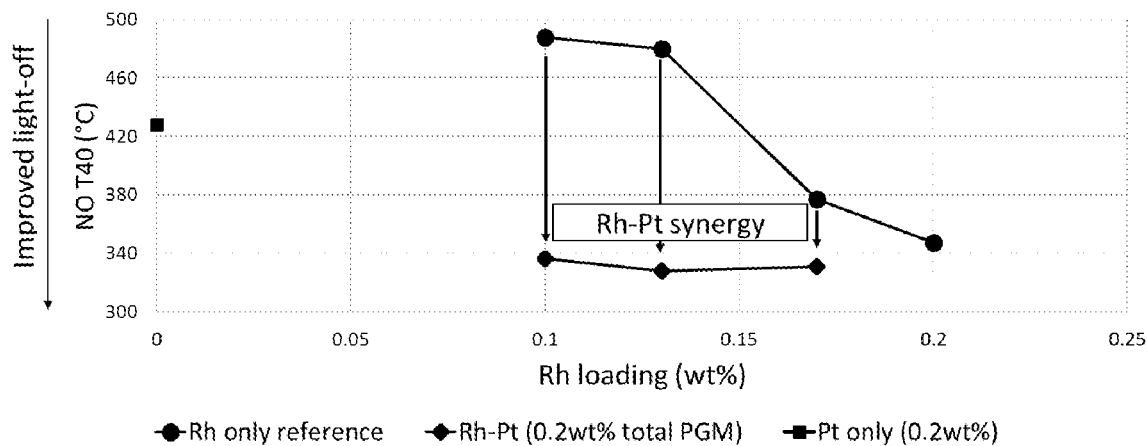
FIG. 4 shows SCAT light off results of Catalysts 1-8.

NO $T_{40}$ light off temperatures of Catalysts 6-8 and Comparative Catalysts 1-5 (aged according to the conditions in Table 2) are shown in FIG. 4 ($T_{40}$ is the temperature when the conversion reaches 40%). The conversion of THC, CO and NO were calculated from comparing the concentration of the feed gas and the gas at the outlets of the catalysts. Catalysts 6-8 (the Rh—Pt bimetallic catalysts) of the present invention gave significantly improved light-off performance when compared with Comparative Catalysts 2-4 (the Rh only comparative catalysts) with a 45-150° C. lower $T_{40}$ value. Comparative Catalyst 5 demonstrates the high temperature light-off of monometallic Pt, suggesting that for the bimetallic systems, Pt is promoting the Rh catalysts, i.e. the small addition of Pt to Catalysts 6-8 maintains a more active Rh state following the 950° C. cool down in oxygen. Furthermore, Catalysts 6-8 gave a small improvement in $T_{40}$ relative to Comparative Catalyst 1, i.e. up to 50% Pt substitution improves upon the 0.2% Rh-only performance.

Example 2: Reactant Slip Performance Under a Simulated DFSO Event

Figure 5:
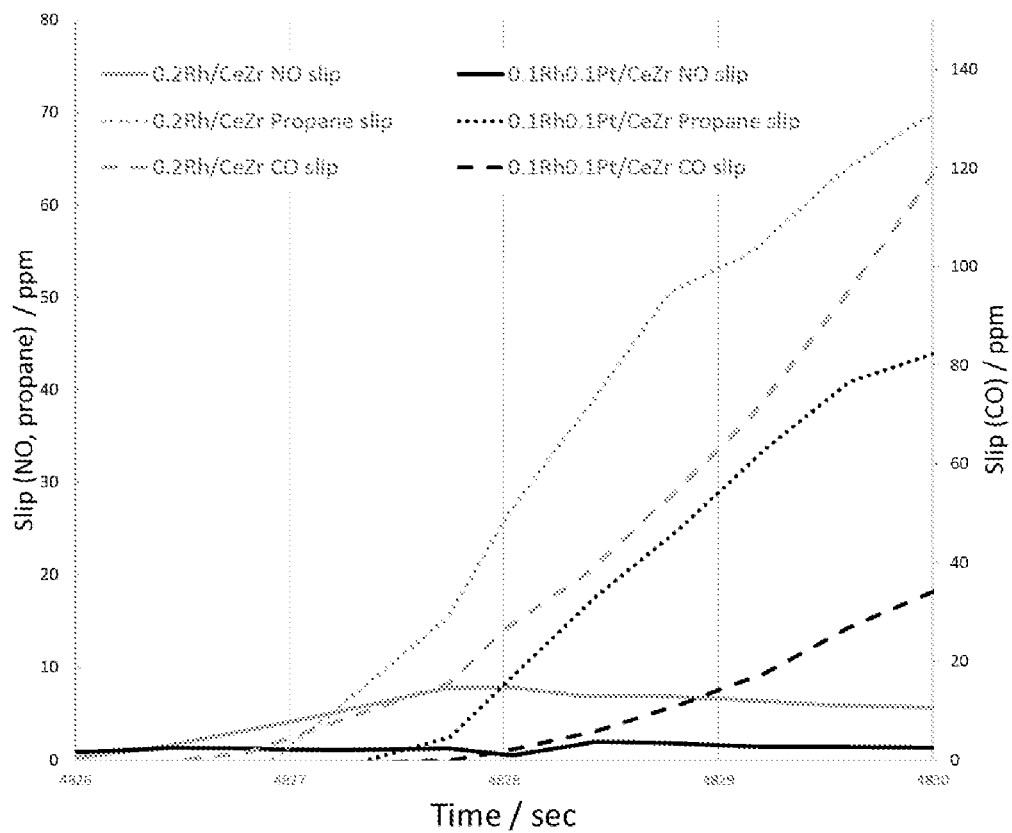
FIG. 5 shows SCAT DFSO experiment results of Comparative Catalyst 1 and Catalyst 8.

Comparative Catalyst 1 and Catalyst 8 were tested separately over a second SCAT device. Catalyst activity during a so-called deceleration fuel shut off (DFSO) type event was evaluated by exposing the catalysts to a 30 s lean gas mix followed by a fast switch to rich reactant conditions (see Table 4) at 500° C. and a space velocity of 1500 $Lg^{-1}h^{-1}$. FIG. 5 shows the first 3 seconds following the introduction of the rich reactant gas mix over the catalyst. Slip of CO, propane and NO in ppm are reduced for Catalyst 8 compared to Comparative Catalyst 1. As with Example 1, Pt keeps Rh in a more active state following the extended lean gas treatment.

TABLE 4

Gas mix compositions for the SCAT DFSO experiment

| | Pre-treatment gas mixes (lean) | Reaction gas mixes (rich) |
|---|---|---|
| $CO_2$ (%) | 14 | 14 |
| $O_2$ (%) | 10.13 | 0.59 |
| CO (%) | 0 | 0.8 |
| $H_2$ (%) | 0 | 0.26 |
| Propene (ppm) | 0 | 666 |
| Propane (ppm) | 0 | 333 |
| NO (ppm) | 0 | 1000 |
| $H_2O$ (%) | 5 | 5 |
| Lambda | — | 0.98 |

Comparative Catalyst A
Second Catalytic Region:
The second catalytic region consists of Pd supported on a washcoat of CeZr mixed oxide, La-stabilized alumina and barium carbonate. The washcoat loading of the second catalytic region was about 2.1 g/in³ with a Pd loading of 74 g/ft³.

This washcoat was then coated from the inlet face of a ceramic substrate (600 cpsi, 2.5 mil wall thickness) using standard coating procedures with coating depth targeted of 50% of the substrate length, dried at 100° C. and calcined at 500° C. for 45 mins.

Third Catalytic Region:

The third catalytic region consists of Pd supported on a washcoat of CeZr mixed oxide, La-stabilized alumina and barium carbonate. The washcoat loading of the third catalytic region was about 2.1 g/in³ with a Pd loading of 24 g/ft³.

The washcoat was then coated from the outlet face of the ceramic substrate containing the second catalytic region from above, using standard coating procedures with total coating depth targeted of 50% of the substrate length, dried at 100° C. and calcined at 500° C. for 45 mins.

First Catalytic Region:

The first catalytic region consists of La-stabilized alumina and Rh supported on a CeZr mixed oxide. The washcoat loading of the first catalytic region was about 1.3 g/in³ with a Rh loading of 6 g/ft³.

The washcoat was then coated from the outlet face of the ceramic substrate containing the second and the third catalytic regions from above, using standard coating procedures with total coating depth targeted of 100% of the substrate length, dried at 100° C. and calcined at 500° C. for 45 mins.

The coating order for Comparative Catalyst A is second catalytic region, third catalytic region, then first catalytic region.

Catalyst B

Catalyst B was prepared according to the similar procedure as Comparative Catalyst A with the exception that the washcoat loading of the first catalytic region was about 1.3 g/in³ with a Rh loading of 5 g/ft³ and a Pt loading of 1 g/ft³. And both Rh and Pt in the first catalytic region were supported on the CeZr mixed oxide.

TABLE 5

PGM loadings in Comparative Catalyst A and Catalyst B

| | 1st Catalytic Region | | | 2nd Cat. | 3rd Cat. |
|---|---|---|---|---|---|
| | Rh (g/ft³) | Pt (g/ft³) | Pt:Rh Ratio (wt.) | Region Pd (g/ft³) | Region Pd (g/ft³) |
| Comparative Catalyst A | 6 | 0 | 0 | 74 | 24 |
| Catalyst B | 5 | 1 | 1:5 | 74 | 24 |

As shown in Table 5, the PGM loadings in Catalyst B were modified based on Comparative Catalyst A. In Catalyst B, 1 g/ft³ of Rh in the first catalytic region of Comparative Catalyst A was replaced with 1 g/ft³ of Pt in the first catalytic region. These catalyst designs offer cost effective formulations based on current PGM pricing and trend.

Example 3: Vehicle Testing Procedures and Results

The bench aged samples of Comparative Catalyst A and Catalyst B were tested over a vehicle of 1.5-liter engine with WLTP. The bench aging is under 6.1-L engine in the same run for 200 hrs with four mode aging cycle, with peak bed temperature at about 980° C. in the catalysts. Results of vehicle exhaust diluted bag data over bench aged parts are shown in Table 6.

In addition to the cost saving due to inventors' catalyst formulation design, Catalyst B of the present invention still presented comparative performances for all emissions, compared with Comparative Catalyst A.

TABLE 6

Results of Emissions by Vehicle Diluted Bag Data

| | Exhaust Emissions (mg/km) | | | |
|---|---|---|---|---|
| | THC | NMHC | CO/10 | NO$_x$ |
| Comparative Catalyst A | 51 | 36 | 69 | 28 |
| Catalyst B | 58 | 40 | 66 | 27 |

We claim:

1. A catalytic article for treating exhaust gas emission from a gasoline engine comprising:
   a substrate comprising an inlet end and an outlet end with an axial length L;
   a first catalytic region comprising a first platinum group metal (PGM) component supported on a first support material,
   a second catalytic region comprising a second PGM component,
   wherein the first PGM component comprises rhodium (Rh) and platinum (Pt);
   wherein Pt and Rh has a weight ratio of at least 1:10;
   wherein the first support material comprises a ceria-zirconia mixed oxide; and
   wherein the ceria-zirconia mixed oxide comprises at least 35 wt. % CeO$_2$.

2. The catalytic article of claim 1, wherein the first catalytic region further comprises a first inorganic oxide.

3. The catalytic article of claim 2, wherein the first inorganic oxide is selected from the group consisting of alumina, magnesia, silica, lanthana, neodymia, praseodymia, yttria, and mixed oxides or composite oxides thereof.

4. The catalytic article of claim 2, wherein Rh and Pt are not supported on the first inorganic oxide.

5. The catalytic article of claim 1, wherein the first catalytic region further comprises palladium (Pd).

6. The catalytic article of claim 5, wherein Pd is supported on the first inorganic oxide.

7. The catalytic article of claim 6, wherein Pd is not supported on the first support material.

8. The catalytic article of claim 1, wherein the ceria-zirconia mixed oxide comprises 35 wt. %-75 wt. % CeO$_2$.

9. The catalytic article of claim 1, wherein the second catalytic region further comprises a second oxygen storage capacity (OSC) material, a second alkali or alkaline-earth metal component, and/or a second inorganic oxide.

10. The catalytic article of claim 1, wherein the second PGM component is selected from the group consisting of platinum, palladium, rhodium, and a mixture thereof.

11. The catalytic article of claim 1, wherein Pt and Rh have a weight ratio of at least 1:8.

12. The catalytic article of claim 1, wherein Pt and Rh have a weight ratio of 10:1 to 1:10.

13. The catalytic article of claim 12, wherein Pt and Rh have a weight ratio of 8:1 to 1:8.

* * * * *